United States Patent
Hopkins

(10) Patent No.: US 12,453,975 B2
(45) Date of Patent: *Oct. 28, 2025

(54) DIRECT AIR CARBON CAPTURE SYSTEM

(71) Applicants: Shannon Smith-Crowley, Sacramento, CA (US); Cole Smith-Crowley, Sacramento, CA (US); Calix Smith-Crowley, Sacramento, CA (US)

(72) Inventor: Demitri Hopkins, Tigard, OR (US)

(73) Assignees: Shannon Smith-Crowley, Sacramento, CA (US); Cole Smith-Crowley, Sacramento, CA (US); Calix Smith-Crowley, Sacramento, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/643,709

(22) Filed: Apr. 23, 2024

(65) Prior Publication Data

US 2024/0269692 A1  Aug. 15, 2024

Related U.S. Application Data

(62) Division of application No. 17/479,130, filed on Sep. 20, 2021, now Pat. No. 11,975,339.

(Continued)

(51) Int. Cl.
*B03C 3/41* (2006.01)
*B01D 53/26* (2006.01)
(Continued)

(52) U.S. Cl.
CPC ............... *B03C 3/41* (2013.01); *B01D 53/26* (2013.01); *B01D 53/323* (2013.01); *B03C 3/011* (2013.01);
(Continued)

(58) Field of Classification Search
CPC combination set(s) only.
See application file for complete search history.

(56) References Cited

U.S. PATENT DOCUMENTS 3,668,836 A * 6/1972 Richardson ............... B03C 3/09
 96/66
3,740,927 A * 6/1973 Vincent ..................... B03C 3/09
 96/54

(Continued)

FOREIGN PATENT DOCUMENTS

CN 101936202 A * 1/2011
WO WO 2008008572 1/2008

*Primary Examiner* — Jennifer Dieterle
*Assistant Examiner* — Sonji Turner
(74) *Attorney, Agent, or Firm* — Heisler & Associates

(57) ABSTRACT

An ionization chamber is provided with a series of parallel plates spaced from each other and with holes passing therethrough. Alternating plates have either a highest high voltage or a lower high voltage provided thereto, such as through a DC transformer coupled to an electric power source. Holes in alternating plates are preferably offset so that airflow through the plates occurs along curving pathways. The plates are sufficiently highly charged to cause carbon dioxide to be ionized and for carbon ions to become trapped within wells defining lowest regions of electric charge within an electric field inside the ionization chamber. Fans control airflow through the ionization chamber. A dehumidifier is provided upstream of the ionization chamber to reduce moisture content within the incoming gas. After the carbon has collected within the wells, harvesting of the carbon ions as carbon nano particle powder can occur within a carbon cache.

7 Claims, 4 Drawing Sheets

Related U.S. Application Data

(60) Provisional application No. 63/080,235, filed on Sep. 18, 2020.

(51) Int. Cl.
| | | |
|---|---|---|
| *B01D 53/32* | (2006.01) | |
| *B03C 3/011* | (2006.01) | |
| *B03C 3/09* | (2006.01) | |
| *B03C 3/36* | (2006.01) | |
| *B03C 3/38* | (2006.01) | |
| *B03C 3/60* | (2006.01) | |

(52) U.S. Cl.
CPC ................ *B03C 3/09* (2013.01); *B03C 3/368* (2013.01); *B03C 3/38* (2013.01); *B03C 3/60* (2013.01); *B03C 2201/24* (2013.01)

(56) References Cited

U.S. PATENT DOCUMENTS

| | | | |
|---|---|---|---|
| 3,820,306 A * | 6/1974 | Vincent | B03C 3/09 |
| | | | 96/54 |
| 6,147,452 A | 11/2000 | Kunhardt | |
| 10,005,085 B2 | 6/2018 | Wright | |
| 2010/0282083 A1 * | 11/2010 | Edwards | B03C 3/155 |
| | | | 55/482 |
| 2015/0279622 A1 | 10/2015 | Jang et al. | |
| 2022/0339641 A1 * | 10/2022 | Hepperle | F24C 15/2035 |

* cited by examiner

DIRECT AIR CARBON CAPTURE SYSTEM

CROSS-REFERENCE TO RELATED APPLICATIONS

This application is a divisional of U.S. patent application Ser. No. 17/479,130 filed on Sep. 20, 2021, which claims benefit under Title 35, United States Code § 119(e) of U.S. Provisional Application No. 63/080,235 filed on Sep. 18, 2020.

FIELD OF THE INVENTION

The following invention relates to apparatuses, systems and methods for removing carbon from ambient air in the atmosphere. More particularly, this invention relates to equipment and methodologies which ionize carbon dioxide and separately collect the carbon from the air or other gases.

BACKGROUND OF THE INVENTION

The amount of carbon dioxide in Earth's atmosphere has been increasing since carbon dioxide measurements began taking place, over the last few centuries. Earliest historical measurements of carbon dioxide in the atmosphere place the amount of carbon dioxide at approximately 200 to 280 ppm. This proportion of the atmosphere composed of carbon dioxide has now increased in the 21st-century to greater than 400 ppm and is increasing at a rate of about one percent per year.

While carbon dioxide in small proportions is not directly unhealthy to living organisms (animals exhale carbon dioxide as part of normal respiration and plants require carbon dioxide to be taken in, as part of their growth process), carbon dioxide ($CO_2$) does have influences on Earth's climate and ecology. At least one such influence is the "greenhouse effect" by which carbon dioxide in the atmosphere acts as a form of thermal blanket to trap heat within the atmosphere, generally raising atmospheric temperatures. Other influences have also been documented, including acidification of the oceans from the creation of greater amounts of carbonic acid, and other negative influences associated with excess carbon dioxide in the atmosphere.

Other gases in the atmosphere, other than carbon dioxide, can also have undesirable impact on climate. For instance, methane ($CH_4$) is generally recognized as significantly more destructive of various climate subsystems than carbon dioxide, which can generally have a warming effect thirty times more potent greenhouse effect than $CO_2$ and/or other negative influences. However, carbon dioxide has an outsized role in climate change due to the large amount of carbon dioxide in the atmosphere and its generally non-reactive status with other gases in the atmosphere, so that once carbon dioxide is created, it tends to remain.

The primary driver for removal of carbon dioxide from the atmosphere is normal plant respiration, where carbon dioxide is taken in and oxygen is emitted. Because the amount of vegetation on the Earth is generally constant, or only changing in relatively minor percentages consistent on a yearly average, there are large fluctuations with the seasons that have an effect on $CO_2$, this natural carbon dioxide removing process does not appear to be able to keep up with the excess carbon dioxide being generated and added into the atmosphere.

Carbon dioxide added into the atmosphere can come from a variety of different sources. Combustion of fossil fuels generally involves converting of a fuel molecule including carbon and hydrogen into carbon dioxide and water vapor. Thus, when fossil fuels are combusted, carbon dioxide is added into the atmosphere. Other natural processes also add to carbon dioxide in the atmosphere over time, including deforestation, and other forms of at least somewhat natural carbon dioxide discharge.

One solution to the problem of undesirable climate change associated with excess carbon dioxide in the atmosphere is to tackle the root causes of carbon dioxide generation themselves, including less usage of fossil fuel combustion for heating and/or energy generation, and adjusting of other societal practices which tend to be carbon dioxide producers and emitters. While such efforts can in many instances be effective, they also come with drawbacks including the necessity for changes in societal practices, and the associated disruptions and capital expense that can be involved. Also, such efforts are in many instances blocked by absence of sufficient political will, property rights and other rights of carbon dioxide emitters, and other challenges. Even when changes are approved, these changes to not remove the carbon dioxide which is already in the atmosphere, but rather can only affect the rate of increase of carbon dioxide.

Accordingly, a need exists for other methodologies to remove carbon dioxide from the atmosphere, rather than relying solely on curtailment of carbon dioxide production and release mechanisms. Such techniques for removal of carbon dioxide (or at least the carbon from the carbon dioxide molecule, generally releasing the oxygen back into the atmosphere) have generally become known as "carbon capture." With carbon capture, the emphasis is not placed on preventing emission of the carbon dioxide in the first place, but rather removing the carbon after it has been emitted into the atmosphere or as it is emitted. Such carbon capture techniques not only provide an alternative to be implemented separate from or in coordination with carbon dioxide emission containment methodologies, but also carbon capture has the potential to reverse climate change by not just stopping the increase in carbon dioxide's percentage of the atmosphere, but reducing the percentage of carbon dioxide back down to earlier historical levels. With sufficient carbon capture systems online, the percentage of carbon dioxide in the Earth's atmosphere could be actively managed and maintained at levels deemed to be desirable.

Present carbon capture techniques are used to reduce the overall load of carbon dioxide emissions into the air, sometimes with the intent of making use of the carbon that is captured. For example, some carbon capture methods have focused on the creation of liquid fuel, like the raising of algae and the processing of that algae into bio-fuel.

Traditional mechanisms of carbon capture have focused on using plants, algae, or chemical processing to force the separation of carbon from the carbon dioxide, which come with disadvantages in the capability of these technologies to scale up. Perhaps the largest challenges with these techniques are the engineering challenges associated with condensing the technology. All photosynthesis based mechanisms of carbon capture require high surface area exposure to light, typically sunlight, which limits the vertical scale and increases the overall scale and size to unmanageable levels when at the scale of having a meaningful affect on carbon emission and concentration totals.

Another method of carbon capture is "point of emission" capture, which involves taking the carbon dioxide from large emission sources, such as cement manufacture or coal plants, and pumping it underground for long term storage. This presents an issue that each point of emission must establish a system of capture, which has geological considerations. In most areas, the carbon can leak back to the surface, and only a few select regions are suitable to capture the carbon permanently. Further, the biggest option in geological storage is pumping into deep coal veins that cannot be mined, as the coal surface can chemically hold the carbon dioxide, but it has since been discovered that this can force methane to be pushed out of the coal veins to rise to the surface. Methane, being a significantly worse greenhouse gas, is then released into the air, negating the purpose of the original carbon capture.

The most recent efforts in carbon capture have focused on something the industry has called "Carbon Capture and Utilization," which involves using chemical methods to convert the carbon dioxide into other molecules that can be put to work. These methods use chemical catalysts to take the carbon from the molecule and then associate it into other molecules for fuel like hydrocarbons, e.g. methanol. These processes usually involve either expensive materials like pure hydrogen, making them difficult to scale, or require high energy inputs, typically as heat, to catalyze a reaction into carbonate, like potassium carbonate or magnesium carbonate.

SUMMARY OF THE INVENTION

The present invention provides a way to extract carbon from carbon dioxide in ambient air (or from other sources of carbon dioxide) by utilizing electrostatic fields generated by electricity, converting the carbon from the carbon dioxide into a valuable carbon nanopowder.

Electricity is transformed into high voltage DC source that charges plates within an ionization chamber plasma filter with specific voltages and amperages. The voltage is set by the device's physical setup, dependent on the distance set between the plates and the flow rate of air through the chamber, such as with fans or other drivers. The amperage is set by the local environmental variables, such as the parts per million of carbon dioxide in the air and the flow rate through the device.

To ionize the carbon effectively in ambient air, the air is pre-treated to remove water molecules and controlled for flow rate. To accomplish this, a dehumidifier with a certain tolerance of throughput is set up to feed into the plasma filter, and fans with a high precision are used to help regulate airflow through changing environmental conditions.

The device has a collection cache to catch the carbon nanopowder that forms when the device is cycled off and the plasma cools down to ground state. This cycling is set to a timer by estimate of how much carbon plasma can be efficiently collected before needing to let it cool.

An onboard computer is used to take in data from sensors and control variables in the device such as power management, amperage control, fan speed, dehumidification, cycling of on and off phases for carbon nanopowder collection, and alerts sent out. The sensors used include a carbon dioxide sensor, humidity sensor, atmospheric pressure sensor, detection of carbon nanopowder in the cache, airflow rate sensor and other air sensors to determine pollution content.

The onboard infrastructure interfaces with electrical equipment and the electrical grid in the application of using these devices for power clipping. In this instance, electricity over-generation, as seen often in solar power generation, can be switched into powering carbon removal in a staged manner. This is a service done during time periods where electricity prices can dip negative for producers selling onto the grid, when it's not easy or possible to turn off the generation of electricity.

The basis of this device uses a difference in ionization energy between carbon and other elements present in the air. This is accomplished through inducing a breakdown voltage between parallel plates.

The breakdown voltage is determined by an equation called Paschen's Law, which describes the ability for ionization to occur above specific voltages over the pressure-distance variable. Different sub-variables are input for the gas species, and the innovation within this present invention is to reach the critical energies required for the pressure-distance, while staying below the necessary energy that would keep any of the other atoms in air ionized, like oxygen, nitrogen, and hydrogen.

These parallel plates are set in series, with all the odd plates (1, 3, 5, 7, etc.) being positively charged at a high voltage (high positive), and all even plates (2, 4, 6, etc.) being positively charged at a lower voltage (low positive), such that the order goes high positive, low positive, high, low, high, and always starting and ending on high positive.

This voltage is placed on the plates in one embodiment by high voltage DC transformer equipment and attached to the plates through an ionization chamber housing with electrodes to convey the necessary voltage at the correct amperage for the amount of carbon atoms needed to be ionized. This is controlled by an onboard computer or other processor which is informed of air pressure, $CO_2$ content in parts per million, and other relevant variables, by a sensor array at the air (or other gas source) intake of the overall system.

These plates contain holes to allow airflow therethrough, and these holes are offset to not overlap between the high positive and low positive plates. This ensures all the air passed through the plates must travel between the high positive and low positive plates, ensuring all atoms are exposed to the voltage differential created by the parallel plates. The effect of this is to propagate an ionization cascade of the carbon dioxide between the parallel plates, freeing the carbon through ionization.

To maintain a consistent plasma generation within the device, the amperage is closely matched to the $CO_2$ content flowing through at a known rate and pressure, with minimal conductive molecules in the air that may conduct arcing (e.g. water vapor). This is accomplished by having fans or other drivers regulate the air speed and maintain an even pressure throughout the device, as pressure is one of the critical variables effecting plasma generation. The air is also treated with a dehumidifier to remove water molecules, as droplets of water are the largest source of potential conductivity fluctuations within the air content.

The oxygen in carbon dioxide does not have the energy from the voltage breakdown to stay ionized, and thus returns to ground state and carries through the device. The carbon, staying above its ionization energy, remains positively charged and moves to the local well of lowest electrostatic potential energy, which is in the holes of the low positive plates, and is referred to as "wells" in the electric field of the ionization chamber.

When enough ions have built up in the electrostatic wells, the ions begin to bump and push each other around, and it becomes easier for them to get caught by the air flowing through. These atoms are then ionized again as they go into the next set of high positive-low positive-high positive plates, filling the next electrostatic wells.

When the electrostatic wells have all been saturated, or to the best of the onboard computers estimation of their status from the rate of incoming carbon, the airflow is stopped and the filter is powered off to allow the plasma to return to ground state as a carbon nanopowder, which will drift or be blown down (or otherwise gathered/harvested) into the nanopowder cache (or otherwise) to be collected at a later time. Once the nanopowder is in the cache, the device may resume plasma generation and regular airflow.

Given a set scale of energy consumption, and a plate distance chosen such that 50 kV is above the breakdown voltage necessary for the pressure of incoming air, the following equation can be used to determine an example rate of carbon nanopowder generation and airflow required:

$$50 \text{ kV} \times 1 A = 50 \text{ kW} = 50 \text{ kj/s, power consumed}$$

$$50 \text{ kj/s} \div 1086.5 \text{ kJ/mol} = 0.046 \text{ mol/s,}$$

$$0.046 \text{ mol/s} \times 12000 \text{ mg/mol} = 552 \text{ mg/s carbon generated}$$

$$42 \text{ mol/m}^3 \text{ air} \times 400 \text{ ppm} = 0.0168 \text{ mol/m}^3 \text{ CO}_2/\text{air}$$

$$0.046 \text{ mol/s} \div 0.0168 \text{ mol/m}^3 = 2.74 \text{ m}^3/\text{s airflow required}$$

OBJECTS OF THE INVENTION

Accordingly, a primary object of the present invention is to provide an apparatus which removes carbon from the atmosphere or other gas source when the apparatus is in operation.

Another object of the present invention is to utilize electric power to remove carbon from the atmosphere.

Another object of the present invention is to provide a method for removing carbon from carbon dioxide gas.

Another object of the present mention is to provide an apparatus for ionizing carbon dioxide into separate ions, and to collect positively charged carbon ions as carbon nanopowder sequestered from the atmosphere.

Another object of the present invention is to provide a method and apparatus for manufacture of carbon nanopowder.

Another object of the present invention is to provide a carbon capture system which is compact and scalable for large scale atmospheric carbon removal.

Other further objects of the present invention will become apparent from a careful reading of the included drawing figures, the claims and detailed description of the invention.

BRIEF DESCRIPTION OF THE DRAWING FIGURES

DETAILED DESCRIPTION OF THE PREFERRED EMBODIMENT

Figure 1:
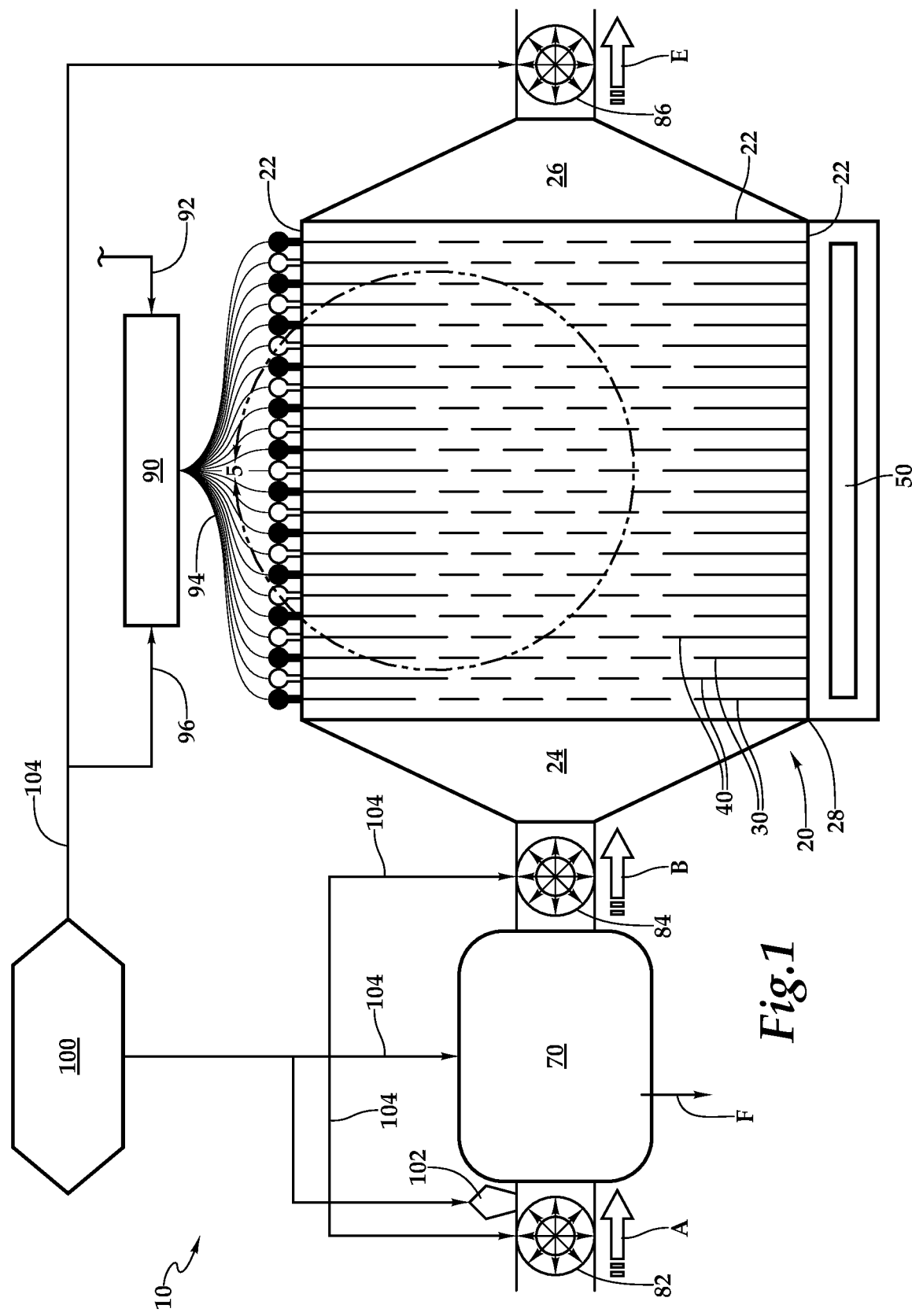
FIG. 1 is a schematic of an overall direct air carbon capture system for capturing carbon from carbon dioxide and sequestering it from the atmosphere, the system featuring an ionization chamber provided semi-schematically in a side elevation full sectional view.

Referring to the drawings, wherein like reference numerals represent like parts throughout the various drawing figures, reference numeral 10 is directed to a system for direct air carbon capture from the ambient atmosphere. The system includes an ionization chamber 20 which ionizes carbon dioxide ($CO_2$) and then removes the ionized carbon, such as for reversing the effects of global warming.

In essence, and with particular reference to FIG. 1, basic details of the system 10 are described, according to an exemplary embodiment. System 10 features as a centerpiece an ionization chamber 20 with a series of parallel plates including high positive charge plates 30 and low positive charge plates 40, provided in an array of alternating plates 30, 40 and with gaps therebetween. Holes 32, 42 in the plates 30, 40 allow air to pass through the plates. The plates 30, 40 are coupled to a DC transformer 90 or other electric power source which provides the plates 30, 40 with an appropriate charge according to specific designs for the ionization chamber 20. Most preferably, a dehumidifier 70 is provided upstream of the ionization chamber 20. A computer 100 can control fans between the dehumidifier 70 and the ionization chamber 20 for control of flow rates and/or pressure, especially within the ionization chamber 20.

An electric field with the ionization chamber 20 includes wells 60 defining regions of lowest electric field strength. Such wells define locations where positively charged carbon ions collect, as they are repelled from higher electric field strength regions, such as adjacent to the plates 30, 40. The size, shape and location of these wells 60 can vary somewhat based on the particular charge of the high positive charge plates 30 and low positive charge plates 40, as well as other characteristics of the invention, such as spacing of gaps between the plates 30, 40, electric conductivity characteristics of the materials forming the plates 30, 40, size of holes 32, 42 passing through the plates 30, 40, and potentially also to some extent a rate of flow of air through the ionization chamber 20. At least the high positive charge plates 30 have a sufficiently high electric charge that when carbon dioxide passes through such areas of high electric field strength, carbon dioxide becomes ionized with positively charged carbon ions separated out of the carbon dioxide, and collecting within the wells 60. A powder cache 50 is located at a lower portion of the ionization chamber 20, where the carbon ions can eventually be collected as carbon nano particle powder. Various harvesting methodologies and equipment can be utilized to move the carbon from the wells 60 to the cache 50 or otherwise gather the carbon C.

More specifically, and with particular reference to FIGS. 1-5, details of the ionization chamber 20 are described, according to this exemplary embodiment. The purpose of the ionization chamber 20 is two-fold. First, regions of sufficiently high electric field strength are established within the ionization chamber to cause the carbon dioxide to be excited into a plasma of carbon ions and oxygen atoms. Second, the ionization chamber is constructed so that the electric field therein is not uniform, but rather has regions (referred to as wells 60) of relatively low electric field strength, where the positively charged carbon ions C will collect as air passes through the ionization chamber (along arrow D of FIGS. 4 and 5). Carbon ions C are thus harvested from the air through operation of the ionization chamber 20 within the system 10 of this invention.

In one example embodiment disclosed in particular detail herein, this ionization chamber 20 has a particular configuration which is generally effective for the purpose identified above. The ionization chamber 20 includes perimeter walls 22 defining an enclosure 28 for the ionization chamber 20, other than at an inlet duct 24 and outlet duct 26. In one embodiment, the perimeter walls 22 include a horizontal top wall and horizontal bottom wall, as well as two vertical lateral side walls. The front of the ionization chamber 20 enclosure 28 can be provided with the inlet duct 24 in this embodiment, and an outlet duct 26 is also provided on an end of the ionization chamber 20 opposite the inlet duct 24.

The enclosure 28 holds the plates 30, 40 in a parallel orientation within the ionization chamber 20 and with a gap spacing the plates 30, 40 from each other. This array of plates 30, 40 preferably includes the plates 30, 40 held in their desired position by perimeter walls 22 or other portions of the enclosure 28. The general purpose of the enclosure 28 is to ensure that air passing through the ionization chamber 20 does not have any opportunity to avoid passing through the holes 32, 42 in the plates 30, 40 and to thus encounter the high electric field regions surrounding the plates 30, 40 which lead to the ionization of the carbon dioxide and the collection of carbon ions C within the wells 60.

The ionization chamber 20 is depicted herein as being generally cubic in shape, including similar dimensions for height, depth and length. However, the ionization chamber 20 could have other dimensions, most preferably orthorhombic in shape. Height/width have airflow rate considerations while depth has efficiency considerations. More layers deep is less power efficient but could go longer before cycling off and collect carbon. Inlet and outlet ends of the ionization chamber 20 are generally those portions of the chamber 20 which face the plates 30, 40. The inlet end preferably includes an inlet duct 24 thereon which has an upstream end coupled to a chamber input fan 84 and a downstream end aligned with perimeter walls 22 of the enclosure 28 of the ionization chamber 20. In this way, all discharge of air (or other gas) from the chamber input fan 84 is passed on into the ionization chamber 20. This flow of air (along arrow B of FIGS. 1 and 4) represents the flow of air into the ionization chamber 20 before carbon capture.

While the ionization chamber 20 could as one option merely have an output end which is open, most preferably an outlet duct 26 is provided similar to the inlet duct 24, and oriented opposite the inlet duct 24. As an option, a chamber output fan 86 can be provided adjacent to the outlet duct 26 for control of flow of the decarbonized air and to control pressure therein. By having two fans 84, 86 on opposite ends of the ionization chamber 20, pressure within the ionization chamber 20 can be controlled and maintained such as at an elevated pressure above atmospheric pressure or at a reduced pressure below atmospheric pressure. Such a pressure adjustment can be done to tune the ionization chamber 20 for optimal performance. Pressure is a sub-variable of pressure-distance, and because plate distance cannot be changed once fabricated, pressure changes are limited to voltage breakdown parameters. Furthermore, and as an option, as the ionization chamber 20 is filling with carbon C within the wells 60, different flow rates and/or pressures might be optimized to prevent disturbing of the carbon C within the wells 60, so that they can gather as much carbon C as possible before the system 10 undergoes a carbon C harvesting step to collect the carbon C, such as within the powder cache 50 at a lower portion of the ionization chamber 20 beneath the plates 30, 40.

Figure 2:
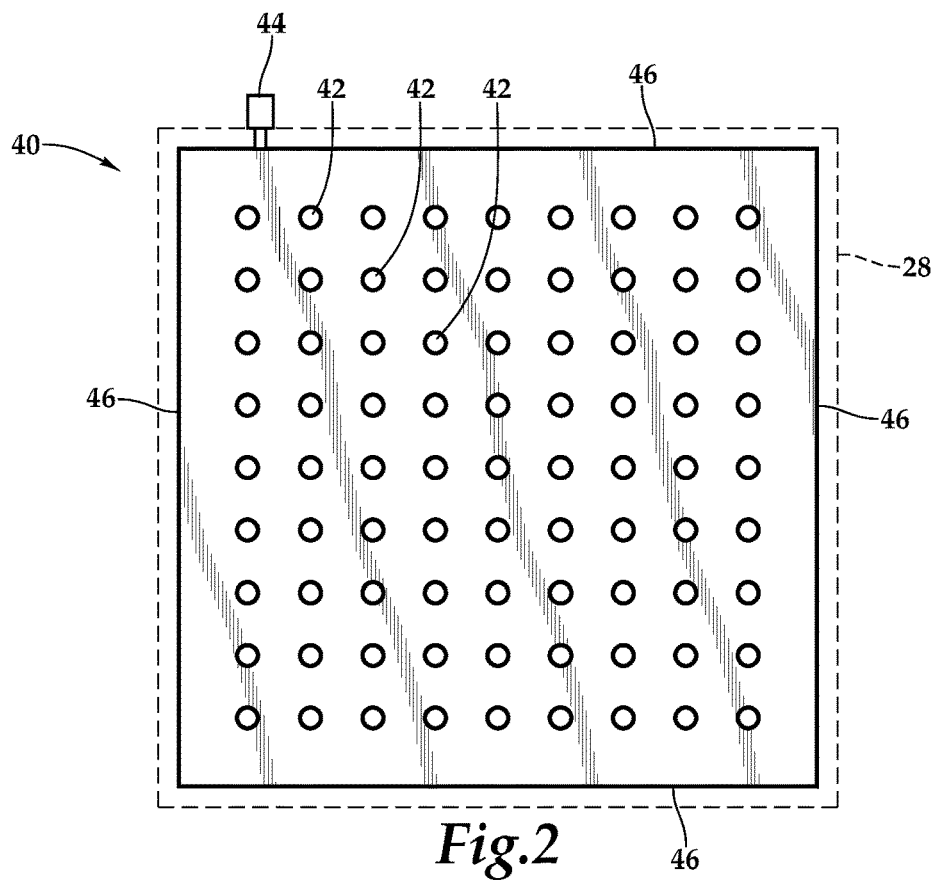
FIG. 2 is a front elevation view of a low positive electric charge plate provided within an ionization chamber such as that included in the system of FIG. 1.
Figure 3:
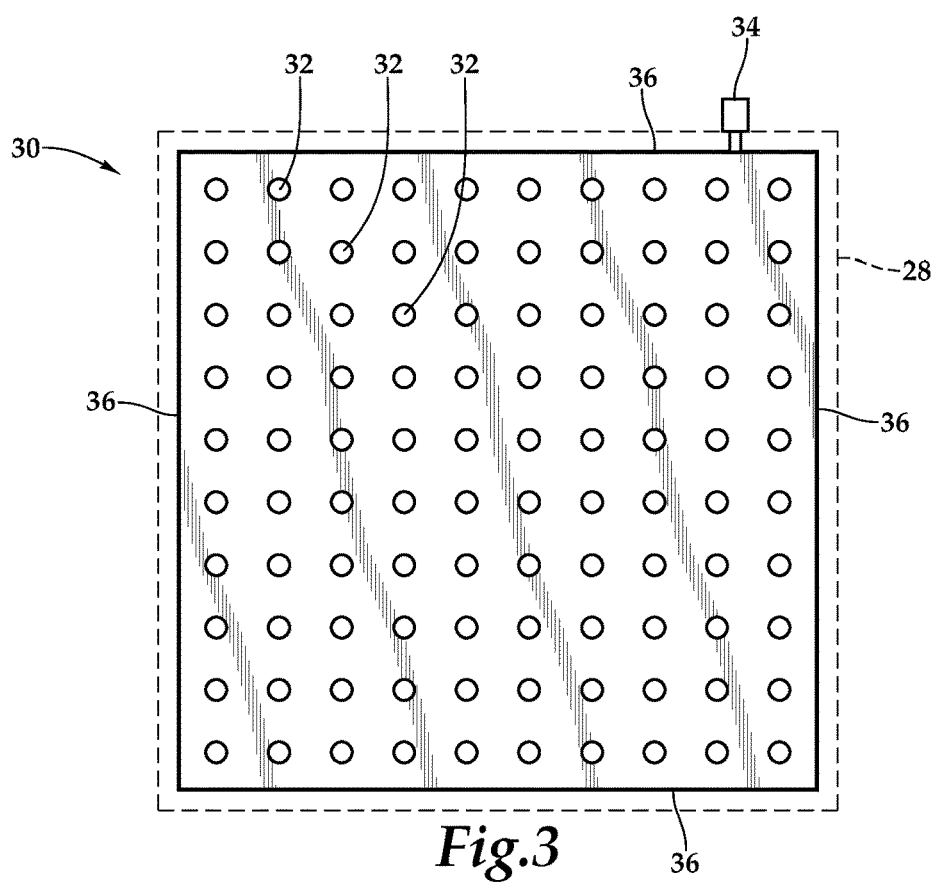
FIG. 3 is a front elevation view of a high positive electric charge plate provided within the ionization chamber such as that included in the system of FIG. 1.
Figure 4:
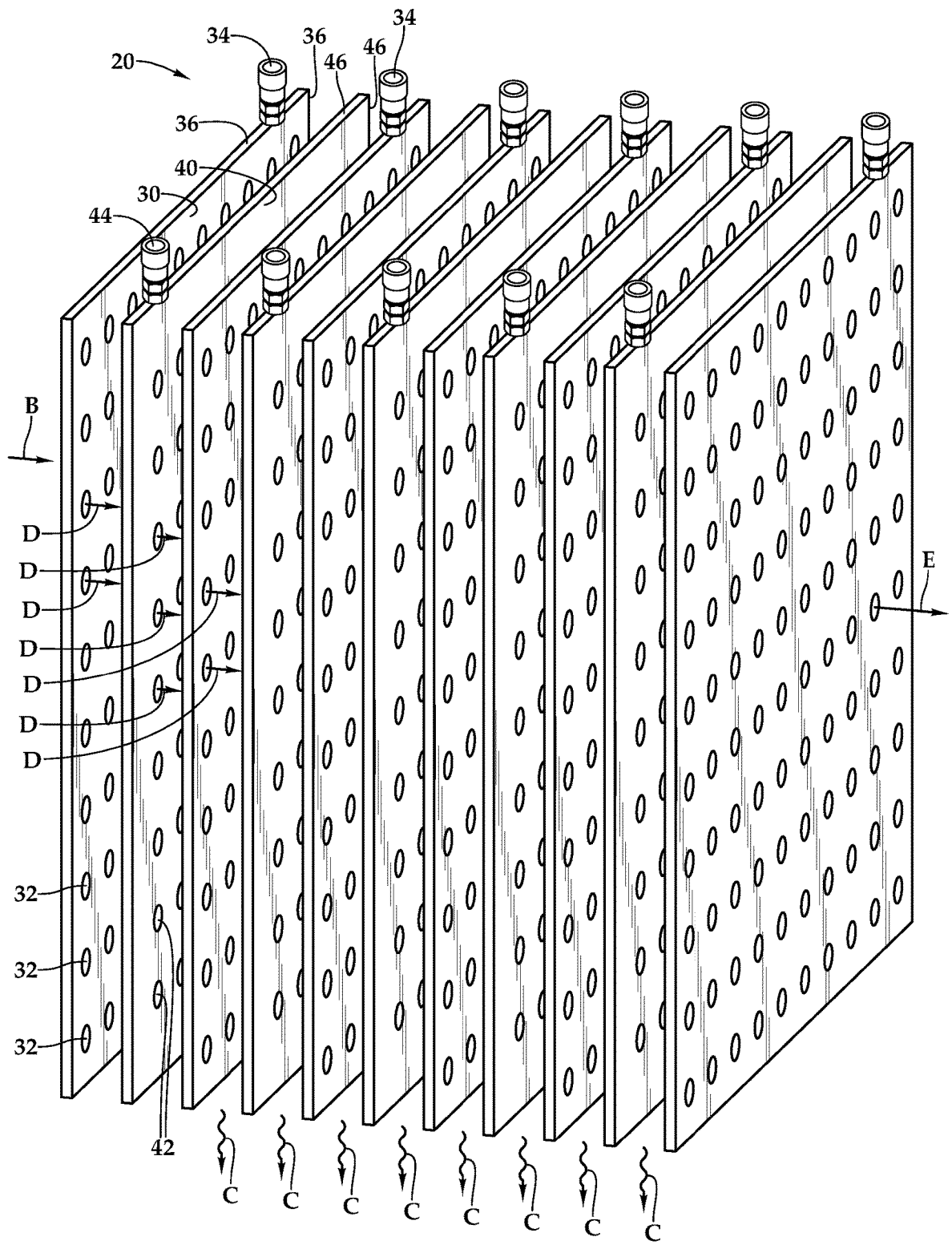
FIG. 4 is a perspective view of an array of the plates of FIGS. 2 and 3 as they are arranged within the ionization chamber of the system of FIG. 1.

With particular reference to FIGS. 2 and 3, details of the high positive charge plates 30 and low positive charge plates 40 are described. FIG. 3 depicts the geometry of the high positive charge plates 30. These plates 30 include a two-dimensional array of holes passing therethrough. These holes are preferably round and spaced uniformly from each other. Most preferably, these holes are oriented in vertical columns and horizontal rows, however, they could be spaced uniformly within a hexagonal/triangular array, as an alternative. In this embodiment, a diameter of the holes 32, 42 is approximately one-third of a spacing between adjacent holes 32, 42. In alternative embodiments, the holes 32, 42 could be larger or smaller, and could be located closer to adjacent holes 32, 42 or further from adjacent holes 32, 42. A direct path from holes 32, 42 is avoided. Otherwise carbon could remain non-ionized. By making a max size and position of holes to avoid any straight path, there is no overlap in any hole 32, 42 viewed from a normal vector to the plane of the plates 30, 40. A thickness of the plates is preferably about half of a diameter of the holes (see FIG. 4). Most preferably, the high positive charge plates 30 are formed of copper or a similarly highly conductive material. The plates 30 are preferably planar in form and of uniform thickness and uniform spacing. An electric tab 34 is provided at an upper perimeter edge 36 of the plate 30. These electric tabs 34 provide locations where a conductor, such as an electric wire, can be attached to deliver current to the high positive charge plates 30, such as from a DC transformer 90 (FIG. 1).

Low positive charge plates 40 preferably have a similar geometry as that of the high positive charge plates 30, with holes 42 provided in uniform spacing within a 2-D array of columns and rows. Alternatives for the high positive charge plates 30 could also be resorted to for the low positive charge plates 40. Most probably, locations of the holes 42 within the low positive charge plates 40 are distinct from positions for the holes 32 within the high positive charge plates 30. In particular, the holes 42 in the low positive charge plates 40 are offset as far as possible from the holes 32 in the high positive charge plates 30. Thus, for instance, if the holes 32 and high positive charge plates 30 were located one inch away from each other on center, and half of an inch from perimeter edges 36 of the high positive charge plates 30, the holes 42 in the low positive charge plates 40 would also be provided one inch away from each other on center, but located one inch away from perimeter edges 46 of the low positive charge plates 40.

Furthermore, if the high positive charge plates 30 have ten rows of holes 30 and 10 columns of holes 30, the low positive charge plates 40 would have nine columns of holes 42 and nine rows of holes 42. This offsetting of the holes 32, 42 with the plates 30, 40 ensures that a pathway for air passing through the ionization chamber 20 and through the holes 32, 42 is a serpentine pathway (along arrow D of FIGS. 4 and 5). The lower positive charge plates 40 are preferably formed of aluminum or similar highly conductive material (preferably not copper to avoid formation of copper aldehyde). The low positive charge plates 40 also include electric tabs 44 wired to the DC transformer 90 to provide them with an appropriate but lower charge than the high positive charge plates 30.

The wells 60 define areas of low electric field strength within the ionization chamber 20. Electric field strength within the ionization chamber 20 is a three-dimensional region where each location within this region has different position coordinates as well as different electric field strength associated therewith. Regions of highest electric field strength are defined by the presence of the high positive charge plates 30. Locations which are spaced from the high positive charge plates 30 have a lesser electric field strength. The low positive charge plates 40 do not have a negative charge, but rather have a positive charge of lesser magnitude than that of the high positive charge plates 30. Thus the low positive charge plates 40 define a region of constant charge lower than the charge of the high positive charge plates 30.

Figure 6:
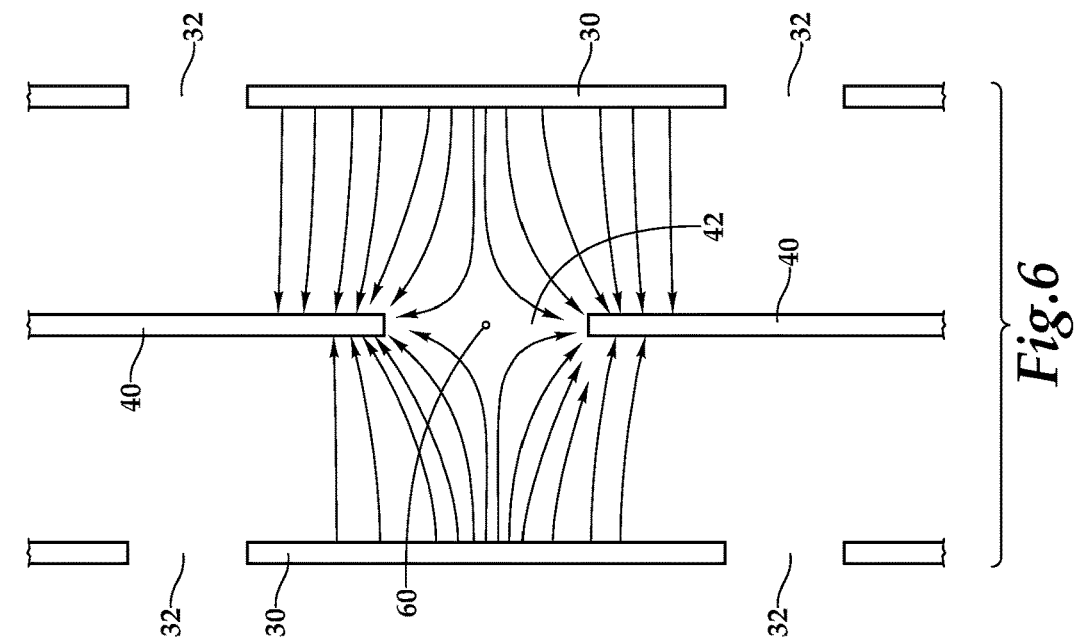
FIG. 6 is a schematic depicting a portion of the electric field adjacent to one of the holes in the low positive electric charge plates of the ionization chamber.
Figure 5:
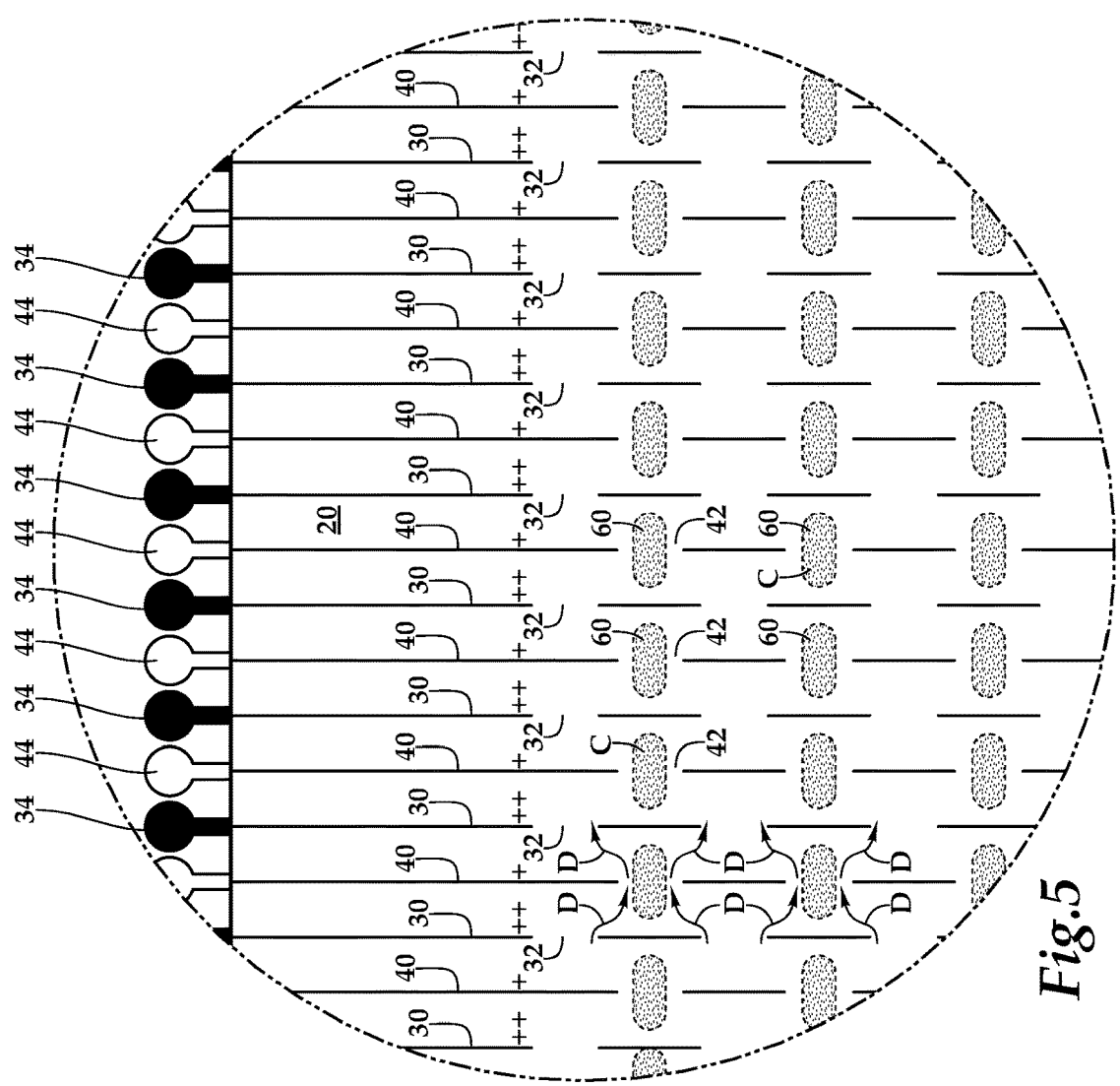
FIG. 5 is a side elevation sectional detail of a portion of the ionization chamber of FIG. 1 further illustrating how the array of high positive electric charge plates and low positive electric charge plates are arranged and how airflow occurs through the plates and where carbon ions collect within wells of an electric field created by this array, before harvesting.

At locations where the holes 42 pass through the low positive charge plates 40, the absence of material forming the low positive charge plates 40 causes a central portion of these holes 42 to define a well 60 of lowest charge area within the ionization chamber 20. This well 60 can have various different sizes, shapes and positions based on factors such as the charge of the plates 30, 40, a spacing of the plates 30, 40 from each other, and a size of the holes 32, 42 passing through the plates 30, 40, as well as the thickness of the plates 30, 40. FIG. 6 shows how electric field lines leave a local low charge area in the middle of the holes 42 in the low positive charge plates 40, defying the well 60 location.

Some of these details are defined by geometry of the plates themselves or structures within the enclosure 28 of the ionization chamber 20 which defines spacing between the plates 30, 40. Other factors can be tuned, such as by adjusting electric charge on the plates 30, 40 through action of the transformer 90. Furthermore, the rate of air passing through the ionization chamber 20 (along arrow D) can also potentially have some affect on which portions of the wells 60 are most conducive to collection of carbon ions C therein. It will be recognized that when the carbon dioxide has encountered a sufficiently high electric field to be ionized and to include positively charged carbon ions, those positively charged carbon ions will be repelled by positively charged structures such as the plates 30, 40, and most particularly, the high positive charge plates 30. The carbon ions C will thus have a high probability of residing within a portion of one of the wells 60, at least partly affected by a flow rate of air passing through the ionization chamber 20.

Such adjusting of charge on the plates can, in one embodiment, cause accumulated carbon ions C to reach sufficiently critical mass within the wells 60 to cause them to tend to "precipitate" and fall down to the bottom of the ionization chamber 20 for collection within a powder cache 50. Such "precipitation" could be encouraged by passing of low electric charge "scoops" to pass through gaps between the plates 30, 40 to collect the carbon nano particle powder, and/or by periodically powering down the plates 30, 40.

Recognizing, according to classical physics principles, that a carbon ion is absent some number (typically four) electrons, in one embodiment, a negatively charged structure (or less positively charged structure than the plates 30, 40), such as a wire, could be passed vertically down through gaps between the plates 30, 40 and the carbon ions C would be attracted to these wires and also gather electrons from these wires, so that the carbon ions would be transformed (also through cooling) into neutrally charged stable carbon nano particles. Such harvesting can occur with such electrical "scoops" in the form of negatively charged wires, or could be scooped with a mechanical scoop of some other configuration. In another embodiment, the ionization chamber 20 can be powered down periodically, and with such powering down, the carbon ions C can settle down to the powder cache 50 for later harvesting and removal.

As other options for carbon ion C collection and harvesting, a filter can be utilized which has the powder deposited into the filter by airflow, such as a filter including the exit upstream of the outlet duct 26, could have the carbon nanopowder deposited into it by residual airflow. The goals of carbon collection include keeping the carbon from reacting with oxygen to again form carbon dioxide, rather to keep the carbon particles out of the atmosphere. Furthermore, carbon nano particle powder of high purity, such as that which is produced by the ionization chamber 20 is a marketable by-product, helping to improve economics with which the system 10 of this invention is utilized.

The system 10 operates the ionization chamber 20, in one embodiment, as depicted in FIG. 1. In this embodiment, the system 10 is configured for tuning of the operation of the system 10 and also optimizing performance by first dehumidifying the air. In particular, the ionization chamber 20 is provided downstream of a dehumidifier 70. This dehumidifier 70 has an entry upstream of an exit. An inlet fan 82 can be provided upstream of the dehumidifier 70. The chamber input fan 84 can be between the dehumidifier 70 and the inlet duct 24 of the ionization chamber 20. The dehumidifier 70 can utilize any of a variety of different de-humidification methodologies of operation to achieve removal of some or all of water vapor from the air. By first removing such water vapor from the air (typically as a liquid along arrow F of FIG. 1), the function of the ionization chamber 20 is to some degree simplified and improved.

The inlet fan 82, as well as the chamber input fan 84 and chamber output fan 86 are preferably high precision variable flow rate fans which receive a control output 104 from a computer 100 to control a speed of these fans. This in turn controls the flow rate of air passing into the dehumidifier (along arrow A of FIG. 1) and a flow rate of dry air passing from the dehumidifier 70 into the ionization chamber 20 (along arrow B of FIG. 1), and also the output rate of reduced carbon air from the ionization chamber (along arrow E of FIG. 1).

The control output 104 can be adjusted responsive to sensors 102 which input information into the computer 100, so that a form of feedback loop is provided for optimal performance of the system 10. The sensors 102 can detect parameters such as temperature, pressure, flow rate, carbon dioxide percentage in the air, humidity, temperature, and any other pertinent parameters. These parameters can then be fed into the control system implemented by the computer 100, to provide the control output 104 for the various fans 82, 84, 86. The computer 100 also preferably provides control output 104 through the control input 96 to the DC transformer 90 or other electric current source coupled to the ionization chamber 20.

The DC transformer 90 or other electric power source receives power input 92, such as in the form of AC or DC input power. The DC transformer 90 has various output wires 94 provided in two different arrays including a high positive charge array of output wires 94 and a low positive charge array of output wires 94, coupled to various electrode tabs 34, 44 of the plates 30, 40. These output wires 94 and the plates 30, 40 themselves are all formed of electrically conductive material. Thus, the transformer 90 readily causes electric charge to accumulate on the plates 30, 40, with the greatest concentration of charge on the high positive charge plates 30.

Typically, this transformer 90 would act as a form of power supply and would be "grounded," so that a region of negative charge would be present and spaced from the output wires 94 by the transformer 90 power supply itself. The ionization chamber 20 would not be grounded, so that it can have multiple different regions of various different levels of positive electric charge thereon, and not have a flow of charges from the plates 30, 40 to a region to which the DC transformer 90 power supply is grounded. The ionization chamber 20 is spaced sufficiently far from a region of grounding of the DC transformer 90 so that an electric field within the ionization chamber 20 is not significantly influenced by the presence of this region of grounding and negative electric charge.

In one embodiment of the invention, the system 10 is powered from the electric grid at times when electric grid has a surplus of power. For instance, at times the wind blows at night or other times when grid power demand is low. Rather than wasting such power, such as night time wind power, this excess power could be utilized to power the system of this invention and capture carbon from the atmosphere at a little or no ultimate cost, especially when factoring in the value of the carbon which has been gathered. In one embodiment, the system 10 is located near a source of potential excess power, so the transmission losses are minimized and so that the coordination of operation of the system 10 can occur along with the production of excess electric power.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When embodiments are referred to as "exemplary" or "preferred" this term is meant to indicate one example of the invention, and does not exclude other possible embodiments. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. An apparatus for separating carbon from oxygen in carbon dioxide molecules, comprising in combination:
   a plurality of first plates;
   said first plates having holes passing therethrough;
   said first plates charged to a first positive voltage;
   a plurality of second plates;
   said second plates having holes passing therethrough;
   said second plates charged to a second positive voltage;
   said first positive voltage of said first plates having a higher positive voltage than said second positive voltage of said second plates; and
   said first plates and said second plates arranged parallel to each other and in an alternating pattern with space therebetween.

2. The apparatus of claim 1 wherein said first plates and said second plates are formed of conductive materials.

3. The apparatus of claim 2 wherein said first plates are formed of copper and said second plates are formed of aluminum.

4. The apparatus of claim 1 wherein said holes in said first plates and said holes in said second plates are offset from each other, such that airflow through said holes in said first plates and through said holes in said second plates does not occur along a straight line.

5. The apparatus of claim 4 wherein said holes in said first plate and said holes in said second plate are each formed of a two-dimensional array of holes.

6. The apparatus of claim 5 wherein said holes in said first plate and said holes in said second plate are arranged in vertical columns and horizontal rows of holes.

7. The apparatus of claim 1 wherein an array of said first plates and said second plates includes a first plate at each end of said array, and with each of said second plates located between two of said first plates, and with a number of said first plates being one greater than a number of said second plates.

* * * * *